United States Patent [19]

Tsui

[11] 4,246,695
[45] Jan. 27, 1981

[54] TWO RAIL SLIDER ASSEMBLY PRODUCTION TECHNIQUE FOR MAKING THIN FILM HEADS

[75] Inventor: Robert T. Tsui, Hillsborough, Calif.

[73] Assignee: Memorex Corporation, Santa Clara, Calif.

[21] Appl. No.: 71,434

[22] Filed: Aug. 31, 1979

[51] Int. Cl.³ .............................................. G11B 5/42
[52] U.S. Cl. ...................................... 29/603; 29/424; 360/103
[58] Field of Search .................. 29/603, 424; 360/103, 360/122, 126

[56] References Cited

U.S. PATENT DOCUMENTS

| | | | |
|---|---|---|---|
| 3,928,908 | 12/1975 | Case | 29/603 |
| 4,158,213 | 6/1979 | Griffith | 29/603 X |

*Primary Examiner*—Carl E. Hall

[57] ABSTRACT

A process is disclosed wherein read/write transducers are applied simultaneously to a mass of motion-constrained, pre-machined, air bearing sliders.

11 Claims, 1 Drawing Figure

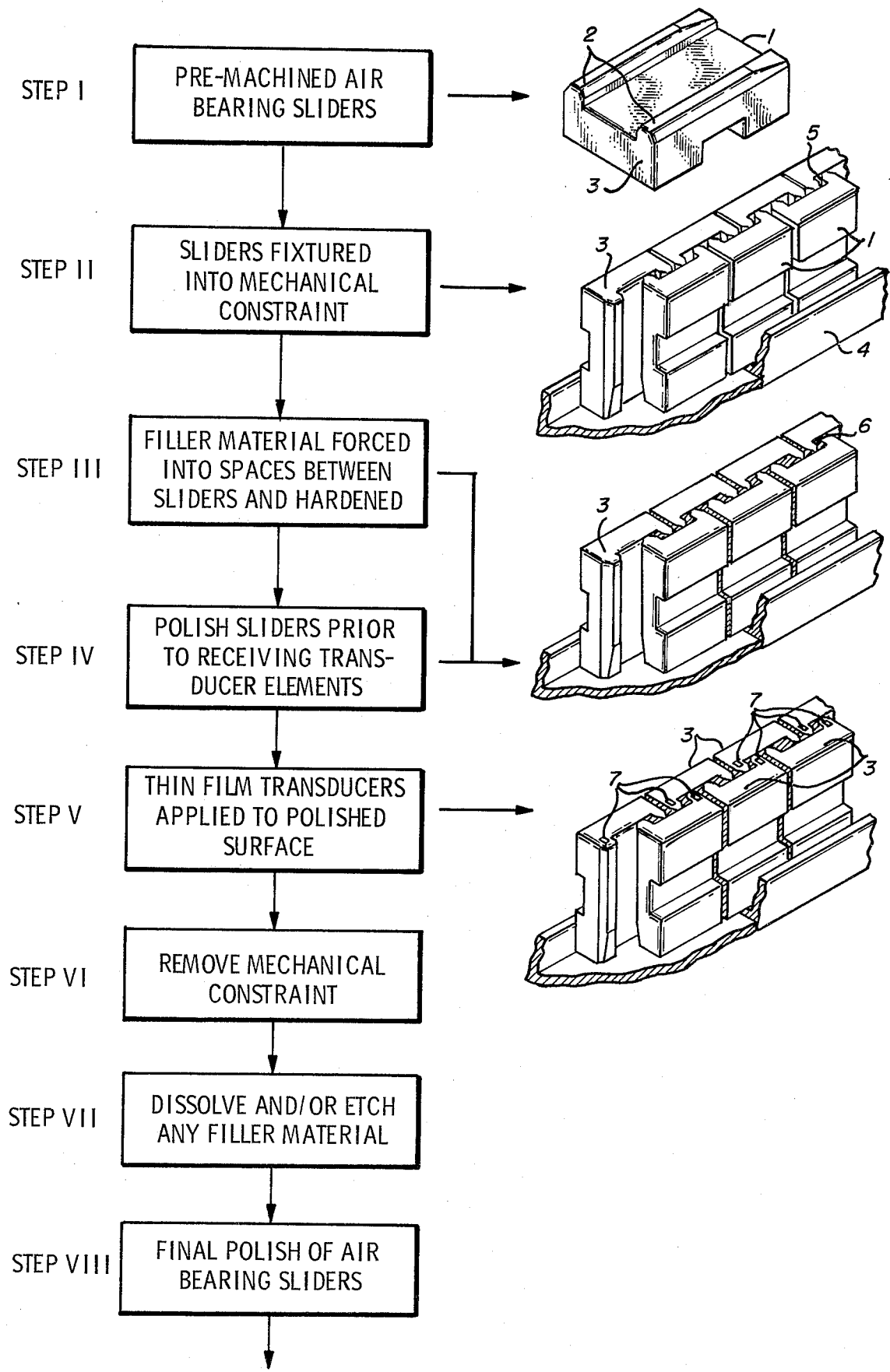

TWO RAIL SLIDER ASSEMBLY PRODUCTION TECHNIQUE FOR MAKING THIN FILM HEADS

BACKGROUND OF THE INVENTION

1. FIELD OF THE INVENTION

This invention relates to magnetic recording read/write transducers as used in computer disc memories. For at least the last decade it has been the practice in large capacity, high density disc memories to utilize rigid discs over which fly inductive transducers. These transducers or read/write heads are affixed to carefully designed air bearings such that the distance between the inductive transducer gap and the recording media is maintained constant during operation, because flying height variations cause extreme signal amplitude deviations and, thus, read/write errors.

For many years, the read/write transducers used in disc memories were constructed by winding a coil of wire around a loop of ferromagnetic material interrupted by a gap. The ferromagnetic material was often ferrite ceramic and the gap geometry was on the order of 40 to 120 microinches (millionths of an inch) in length and 1,400 to 5,000 microinches in width. However, the requirement of increased recording density mandated by the demand for increased storage capacity of disc memory has caused a marked reduction in read/write transducer geometry. Future disc storage devices will require gap lengths of 25 to 40 microinches and widths of 500 to 1,000 microinches. These tighter gap dimensional requirements have urged the use of semiconducter techniques to form the magnetic transducers.

2. Description of the Prior Art

It is known that read/write inductive elements may be formed by use of techniques previously developed by the semiconductor industry. One of these techniques is batch fabrication. For example, U.S. Pat. No. 3,925,884 to Case and U.S. Pat. No. 3,927,470 to Case both teach the batch fabrication of ferrite heads through group assembly and subsequent slicing. The art taught by U.S. Pat. Nos. 3,925,884 and 3,927,470 is widely employed to reduce cost and increase the yield of read/write head assembly lines, but both U.S. Pat. Nos. 3,925,884 and 3,927,470 neither have any treatment of technology or practice in thin film techniques nor air bearings. In a similar manner, U.S. Pat. No. 3,750,274 to Bealle et al. teaches a method for fabricating recording transducers of ferrite and for forming a metallic gap with glass bonding of the pole pieces. Such pole pieces are later sliced to form the recording heads. While such is again effective in reducing cost and increasing production yields over completely manually constructed transducers, the significant technologies of air bearings and thin film techniques for head formation are absent from the teachings.

Certain prior art has taught the use of thin film techniques to form the read/write gap in a magnetic transducer. U.S. Pat. No. 3,656,229 to Sakurai et al. describes a process to provide by vacuum vapor deposition the critical spacing and gap material of a ferrite transducer. U.S. Pat. No. 3,605,258 to Fisher et al. describes how to form a gap in a read/write transducer by means of R. F. (radio frequency) Sputtering. U.S. Pat. No. 3,480,922 to Flur et al. describes a means for forming a magnetic thin film by vacuum R. F. Sputtering. These particular references teach generally the application of thin film techniques, but they lack any teaching with respect to air bearings as such technology is applied to modern computer disc memories, and they lack any teaching with respect to actually forming the inductive turns of a read/write transducer by such thin film techniques.

U.S. Pat. No. 3,657,806 to Simon, and U.S. Pat. No. 3,710,438 to Max et al. both do teach technology as it relates to forming read/write inductive transducers by thin film vacuum techniques. Simon teaches a method of manufacturing a thin film head whereby interconnection is facilitated to an integrated circuit chip. Max et al. teaches a method for batch fabricating heads by thin film techniques so that a multi-layered structure results. However, both Simon and Max et al. leave open the critical technical problems of not only how to bond the thin film inductive elements so formed to a suitable air bearing slider so as to make the finished structure a practical device for use in a computer disc memory, they also fail to teach or suggest how a plurality of thin film heads may be simultaneously bonded to air bearing sliders to mass produce finished magnetic transducers.

In the present state of the art, it is known to combine the technologies of batch fabrication, thin film magnetic transducer production, and air bearing technology into a read/write head manufacturing process. In this known art, a block of ceramic of sufficient dimensions to allow air bearing sliders to be subsequently sliced and diced therefrom is surface-prepared for application of the transducers. A plurality of said transducers are then applied by thin film techniques to the ceramic surface. Next, the ceramic slab is most carefully cut into the shape of air bearing sliders and said sliders are polished and mounted into spring flexures. The deficiency of this process is that the magnetic thin film transducers must sustain all of the harsh mechanical treatment of the ceramic slicing and lapping operations to form the air bearing sliders. As the magnetic read/write transducers are exceedingly delicate, they are often destroyed by such processing steps through handling damage and delamination of the thin film layers during lapping.

It is an object of the present invention to provide a processing technique whereby thin film magnetic transducers may be applied to pre-machined air bearing sliders so as to eliminate the possibility of handling damage to the said transducers during slider rough machining and polishing.

It is an object of the present invention to provide a technique whereby read/write inductive transducers may be formed by thin film techniques directly upon a suitable substrate that has been pre-machined into the form of an air bearing slider.

It is another object of the present invention to provide a technique whereby the processing step (or steps) required to bond the thin film read/write inductive transducer to an air bearing slider is eliminated.

It is yet another object of the present invention to provide a method whereby higher yields and lower processing costs may be obtained in manufacturing thin film inductive read/write heads.

SUMMARY OF THE INVENTION

A process is taught wherein thin film magnetic read/write transducers are formed directly upon the pre-machined and prepared surface of an air bearing slider. The steps are generally as follows:

1. Air bearing sliders are machined and prepared such that the air bearing surfaces require only a final polish.

2. Said sliders are fixtured into a suitable mechanical constraint to prevent relative motion therebetween and with the sliders oriented such that their trailing edges are exposed outwardly from the fixture.
3. The spaces between the sliders are filled with a suitably hard material such as polyimide or photopolymers. Suitable techniques for forcing the filler material into said minute spaces are vacuum suction or pressure.
4. Said filler material in 3. is solidified.
5. The plurality of motion-constrained sliders is then lapped and/or polished on their exposed surface to a finish of 1 to 2 microinches arithmetic average. An alternative method to polishing the sliders themselves is to coat the sliders with a layer of $SiO_2$, $Al_2O_3$, $Si_3N_4$, or other suitable materials. The purpose of this alternative coating is to achieve enhanced adhesion and/or material compatibility between the thin film head and the slider body through use of the intermediate coating. Lapping and/or polishing processes if required can be used to prepare the $SiO_2$, $Al_2O_3$, $Si_3N_4$, or other material surface to the desired 1 to 2 microinches arithmetic average smoothness.
6. Upon the smooth surfaces prepared in 5. are applied the thin film magnetic transducers. Applicable known techniques for performing such applications are R. F. sputtering, vacuum evaporation, electroplating, low temperature vapor deposition, and others. The transducers are applied simultaneously to all sliders. It is within the concept of this invention to apply a single magnetic read/write head to each slider or, if desired, a plurality of heads could be applied to each slider.
7. Next the slider mass is disassembled from said mechanical constraint.
8. The filler material in 3. above is dissolved away permitting individual air bearing sliders to be physically separated for further processing.
9. Individual sliders are final polished upon the air bearing surface to finished specifications.

By the features of this invention, magnetic transducers need not be bonded by a separate operation to each air bearing slider. Manufacturing economies that accrue to high yields should result, because high volume, thin film processing techniques are employed.

BRIEF DESCRIPTION OF THE DRAWING

The single drawing FIGURE illustrates the process flow diagram steps (I through VIII) for attachment of thin film transducer elements to air bearing sliders in a single processing operation and pictorially illustrates the processing operations undertaken in the various stages.

DESCRIPTION OF THE PREFERRED EMBODIMENTS

A process is taught by this invention as follows:
1. By reference to Step I of the FIGURE, air bearing slider 1 which is of a known type such as illustrated in IBM Journal of Research and Development, Vol. 18, No. 6, pp. 493–496, November 1974, is prepared and pre-machined so that the air bearing surfaces 2 require further only a final polish. Preparation of sliders 1 in Step I is accomplished by known techniques which are not a part of the present invention. Overall slider dimensions are machined to within final specifications. Surface 3 is the trailing edge of said slider when ultimately operational in a computer magnetic recording disc memory, and said surface 3 is the plane to which the thin film magnetic transducer elements must be affixed.
2. A plurality of prepared sliders from Step 1 are next ganged together by suitable mechanical constraint 4 as shown in Step II of the figure. Said mechanical constraint 4 prevents relative motion between the sliders.
3. The plurality of sliders locked together by said mechanical constraint 4 are coated with a filler material 6 so that all spaces 5 among and between sliders 1 are filled as shown in Step III. As capillary action will usually not draw the filler material completely into all spaces, pressure or vacuum suction is typically employed. Suitable filler materials are polyimide and photopolymers.
4. Said filler material in Step III is hardened by exposure to heat or other techniques depending upon the chemistry of the filler employed.
5. The surface 3 of all of the sliders held together by mechanical constraint 4 are lapped and/or polished to a surface finish of 1 to 2 microinches arithmetic average as shown in Step IV.
6. Thin film transducer elements 7 are applied to all sliders 1 on surface 3 as prepared by process Step V by well-known techniques as discussed in the Description of the Prior Art above.
7. Mechanical constraint 4 is removed as indicated in Step VI.
8. Filler material 6 is dissolved away to permit separation of individual air bearing sliders as shown in Step VII.
9. Air bearing sliders are final polished upon air bearing surfaces 2 and are ready for final assembly as shown in Step VIII.

As an alternative embodiment in process Step IV hereinabove, surface 3 of each slider may be coated with a layer of material to function as a base foundation for the thin film transducer elements 7. Said base foundation could be composed of $SiO_2$, $Al_2O_3$, $Si_3N_4$, or many other materials that possess non-magnetic, non-conductive properties. Said base foundation layer would be used to enhance adhesion and/or thermal expansion compatibility between the transducer element 7 and slider surface 3.

As a further alternative embodiment, a plurality of thin film transducer elements may be applied to each air bearing slider 1.

I claim:
1. A method of simultaneously manufacturing a plurality of read/write inductive transducers comprising:
   a. pre-machining a plurality of air bearing sliders;
   b. mechanically constraining a plurality of said air bearing sliders in a fixture with the surfaces to receive read/write magnetic transducers facing outward from said fixture;
   c. filling spaces between said sliders with suitable filler material;
   d. hardening said filler material;
   e. polishing said transducer receiving surfaces;
   f. applying read/write magnetic transducers simultaneously to said sliders; and,
   g. removing said filler material from said sliders.
2. The process of claim 1 including the step of polishing the air bearing surface of said air bearing sliders after removal of said filler material.

3. The process of claim 1 wherein said filler material is polyimide.

4. The process of claim 1 wherein said filler material is photopolymer.

5. The process of claim 1 wherein a plurality of transducers are applied to each of said air bearing sliders simultaneously.

6. The process of claim 1 including the step of applying a layer of non-magnetic and non-conductive material to said air bearing slider surface immediately after step e.

7. The process of claim 6 including the step of polishing said layer of non-magnetic and non-conductive material prior to applying said read/write magnetic transducers to said non-magnetic and non-conductive material.

8. The process of claim 6 wherein said non-magnetic and non-conductive material is $SiO_2$.

9. The process of claim 6 wherein said non-magnetic and non-conductive material is $Al_2O_3$.

10. The process of claim 6 wherein said non-magnetic and non-conductive material is $Si_3N_4$.

11. The process of claims 1 or 5 wherein said read/write magnetic transducers are applied to said sliders by thin film techniques.

* * * * *